United States Patent
Upadhye et al.

(10) Patent No.: US 12,518,268 B2
(45) Date of Patent: Jan. 6, 2026

(54) PERSONALLY IDENTIFIABLE INFORMATION SECURE PERSON-TO-PERSON PAYMENT TECHNOLOGY

(71) Applicant: MASTERCARD INTERNATIONAL INCORPORATED, Purchase, NY (US)

(72) Inventors: Nilesh Tulsidas Upadhye, Chelmsford (GB); Joseph D. Hayes, Montclair, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 664 days.

(21) Appl. No.: 17/067,165

(22) Filed: Oct. 9, 2020

(65) Prior Publication Data

US 2022/0114581 A1     Apr. 14, 2022

(51) Int. Cl.
*G06Q 20/38* (2012.01)
*G06F 21/60* (2013.01)
(Continued)

(52) U.S. Cl.
CPC ......... *G06Q 20/382* (2013.01); *G06F 21/606* (2013.01); *G06F 21/6254* (2013.01); *G06Q 20/223* (2013.01); *G06Q 20/3276* (2013.01)

(58) Field of Classification Search
CPC .............. G06Q 20/382; G06Q 20/223; G06Q 20/3276; G06F 21/606; G06F 21/6254
See application file for complete search history.

(56) References Cited

U.S. PATENT DOCUMENTS 11,068,866 B1 * 7/2021 Hecht ................. G06Q 20/385
11,074,577 B1 * 7/2021 Soccorsy ............ G06Q 20/385
(Continued)

FOREIGN PATENT DOCUMENTS

EP         3340157 A1    6/2018
JP      2017-021676 A    1/2017
WO  WO-2004031908 A2 *  4/2004  ............. G06Q 20/02

OTHER PUBLICATIONS

International Search Report and Written Opinion issued in International Application No. PCT/US2021/047227, Mailed Dec. 7, 2021, 7 Pages.

*Primary Examiner* — Patrick McAtee
*Assistant Examiner* — Zesheng Xiao
(74) *Attorney, Agent, or Firm* — Talem IP Law, LLP (57) ABSTRACT

Through the described PII secure P2P payment technology, a P2P payment can be made using a token PAN, allowing for a single product to be used for contactless, e-commerce, and P2P payments. When an account or payment card is digitized using an enhanced processing platform, a token PAN is issued which can be used for P2P payments. The token PAN allows for a P2P payment to made without sharing PII data. The platform can receive, from a sender AHI system, a P2P transfer advice request comprising at least a sender token PAN and a receiver token PAN. The platform can identify from a token vault a sender account number using the sender token PAN and a receiver account number using the receiver token PAN. The platform can communicate, to the sender AHI system, an account authorization message comprising at least the sender account number and the receiver account number.

18 Claims, 8 Drawing Sheets

(51) Int. Cl.
*G06F 21/62* (2013.01)
*G06Q 20/22* (2012.01)
*G06Q 20/32* (2012.01)

(56) References Cited

U.S. PATENT DOCUMENTS

| | | | | |
|---|---|---|---|---|
| 2002/0052841 | A1* | 5/2002 | Guthrie | G06Q 20/10 |
| | | | | 705/40 |
| 2003/0233317 | A1* | 12/2003 | Judd | G06Q 40/02 |
| | | | | 705/39 |
| 2010/0100461 | A1* | 4/2010 | Laing | G06Q 20/40 |
| | | | | 709/204 |
| 2013/0211937 | A1* | 8/2013 | Elbirt | G07F 7/0893 |
| | | | | 705/17 |
| 2015/0081534 | A1* | 3/2015 | Zamer | G06Q 20/102 |
| | | | | 705/40 |
| 2016/0328692 | A1* | 11/2016 | Camps | G06Q 20/3223 |
| 2017/0109846 | A1 | 4/2017 | Groarke et al. | |
| 2017/0200155 | A1* | 7/2017 | Fourez | G06Q 20/34 |
| 2017/0272253 | A1* | 9/2017 | Lavender | H04L 63/12 |
| 2018/0089639 | A1* | 3/2018 | Crum | G06Q 20/102 |
| 2019/0318413 | A1* | 10/2019 | Schulz | G06Q 30/0633 |
| 2020/0112526 | A1* | 4/2020 | Moon | H04L 65/1069 |
| 2023/0004964 | A1* | 1/2023 | Wright | G06F 16/2365 |

* cited by examiner

PERSONALLY IDENTIFIABLE INFORMATION SECURE PERSON-TO-PERSON PAYMENT TECHNOLOGY

BACKGROUND

Maintaining personally identifiable information (PII) security is important for all entities that accept, store, process, or transmit payment information. PII is information that can be utilized to identify or trace an individual's identity including, but not limited to, name, address, social security number, biometric data, or date of birth. Maintaining PII security can be costly or otherwise difficult to achieve.

BRIEF SUMMARY

Personally identifiable information (PII) secure person-to-person (P2P) payment technology is described herein. Through the described technology, a P2P payment can be made using a token primary account number (PAN), allowing for a single product to be used for contactless payments, e-commerce payments, and P2P payments. When an account or payment card is digitized using an enhanced processing platform, the enhanced processing platform issues a token PAN which represents but is not directly a user's actual primary account number and can be used for P2P payments.

The introduction of the described token PAN allows for a P2P payment to made without sharing PII data. Indeed, unlike personal contact information conventionally used in a P2P payment, such as a personal mobile number, email address, or username, the described token PAN is not personally identifiable information. Thus, overall exposure risk for PII data can be reduced.

The enhanced processing platform can receive, from a sender account holding institution (AHI) system, a P2P transfer advice request comprising at least a sender token PAN and a receiver token PAN. The enhanced processing platform can identify a sender account number from a token vault using the sender token PAN; and identify a receiver account number from the token vault using the receiver token PAN. The enhanced processing platform can communicate, to the sender AHI system, an account authorization message comprising at least the sender account number and the receiver account number.

In the case of a receiver-initiated (Pull) PII secure P2P payment, before receiving the P2P transfer advice request, the enhanced processing system can receive, from a receiver AHI system, a P2P pull transfer advice request comprising at least the sender token PAN and the receiver token PAN; and communicate the P2P pull transfer advice request to the sender AHI system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Personally identifiable information (PII) secure person-to-person (P2P) payment technology is described herein. Through the described technology, a P2P payment can be made using a token primary account number (PAN), allowing for a single product to be used for contactless payments, e-commerce payments, and P2P payments. When an account or payment card is digitized using an enhanced processing platform, the enhanced processing platform issues a token PAN which represents but is not directly a user's actual primary account number and can be used for P2P payments.

The introduction of the described token PAN allows for a P2P payment to made without sharing PII data. Indeed, unlike personal contact information conventionally used in a P2P payment, such as a personal mobile number, email address, or username, the described token PAN is not personally identifiable information. Thus, overall exposure risk for PII data can be reduced.

The enhanced processing platform can receive, from a sender account holding institution (AHI) system, a P2P transfer advice request comprising at least a sender token PAN and a receiver token PAN. The enhanced processing platform can identify a sender account number from a token vault using the sender token PAN; and identify a receiver account number from the token vault using the receiver token PAN. The enhanced processing platform can communicate, to the sender AHI system, an account authorization message comprising at least the sender account number and the receiver account number.

In the case of a receiver-initiated (Pull) PII secure P2P payment, before receiving the P2P transfer advice request, the enhanced processing system can receive, from a receiver AHI system, a P2P pull transfer advice request comprising at least the sender token PAN and the receiver token PAN; and communicate the P2P pull transfer advice request to the sender AHI system.

P2P payments are just one of the various mobile and digital payment solutions that exist in the payment industry. Other examples include, but are not limited to, contactless payments, in-application payments, and e-commerce payments.

P2P payments allow for the electronic transfer of funds between two users. Conventionally, a mobile phone number, email address, or username is used to initiate the process through an online or mobile P2P payment application. The initiating user of a P2P payment can be either the sender or the receiver.

As an illustrative example of a conventional sender-initiated P2P payment, the sender links funds to a P2P account, either through a bank account or payment card account. To connect to other users and transfer funds, the sender also provides personal contact information, such as a username, a phone number, or an email address. When the sender is ready to initiate a P2P payment, the sender can enter contact information for the recipient, as well as the amount of funds to transfer. The funds are then debited from the sender's account and credited to the recipient's account.

Contactless payments allow for a user to purchase products or services with a computing device (e.g., a chip embedded on a payment card or a mobile device with a wallet application) using, for example, RFID technology or near-field communication (NFC). Contactless payments work by holding a payment card or digital wallet above a point-of-sale (POS) terminal. Thus, contactless payments do not require any physical contact between the user's device or payment card and the POS terminal.

E-commerce payments allow for the payment of goods and services through electronic systems, such as the Internet. E-commerce payments can be made, for example, through an e-commerce website or electronic environment without any need to use cash or check.

In-app payments allow for the purchase of goods and services from inside an application on a mobile device.

While a P2P payment is a person-to-person payment solution, contactless payments, in-app payments, and e-commerce payments are examples of person-to-merchant payment solutions. Person-to-merchant payment solutions utilize a payment ecosystem that facilitates mobile and digital payments based on the use of token PANS.

That is, for person-to-merchant payments, accounts, such as a bank account or payment card account, are digitized using a digitization platform. The process of digitization can include tokenization. Tokenization is the process of replacing a primary account number (PAN) with a unique alternate card number, or "token." These token PANs can be used for contactless payments, in-app payments, or e-commerce and do not expose any actual account details. Conventionally, tokens operate behind the scenes, thus, users do not know any details about their token PAN numbers. The generation and use of these tokens enable simpler, more secure digital payment experiences.

With the described PII secure P2P payment technology, when an account or payment card is digitized using enhanced processing platform, the enhanced processing platform issues a token PAN which, in addition to person-to-merchant payments, can be used for P2P payments. Advantageously, instead of asking the account holding institution (AHI) to send the consumer's corresponding personal contact information for a P2P payment, the described techniques allow a consumer to use that issued token PAN.

The described technology enables the existing person-to-merchant ecosystem to perform additional functionality, including allowing a consumer to use an issued token PAN for P2P payments. The introduction of the described token PAN allows for a single product to be used for contactless payments, Ecommerce payments, and P2P payments.

Conventionally, in a person-to-merchant ecosystem, a user can pay a merchant that is a part of the corresponding card acceptance network over the card rails and settle account to account using their bank account. As described herein, a conventional transaction infrastructure for person-to-merchant transactions is modified to enable a user to pay another person or entity who does not have connectivity into that transaction infrastructure and corresponding card acceptance network.

An "account" refers to an account, such as, but not limited to, a bank account or a payment card account, held directly or indirectly by a financial institution.

An "account holding institution (AHI)" refers to a financial institution (e.g., a bank, savings association, credit union, or any other person) that directly or indirectly holds an account belonging to a consumer, or that issues an access device (e.g., bank card or credit card) and agrees with a consumer to provide electronic fund transfer services. In some cases, an AHI may be an issuer. An "issuer" refers to a bank system or other institution that provides payment cards to a cardholder.

A "merchant" refers to a provider of goods or services in exchange for payment. The merchant can be physically present at the sale or remote, such as an online retailer.

The terms "user" and "consumer" are used interchangeably herein. The term "personal account number" refers to a financial account number, such as, but not limited to, a bank account number, a PAN, and a payment card number. The terms "personal account number" and "account number" are used interchangeably herein. The terms "payment" and "transaction" are used interchangeably herein. As described herein, token PANs—which are distinct from the actual PANs—do not contain personally identifiable information (PII).

Figure 1A:
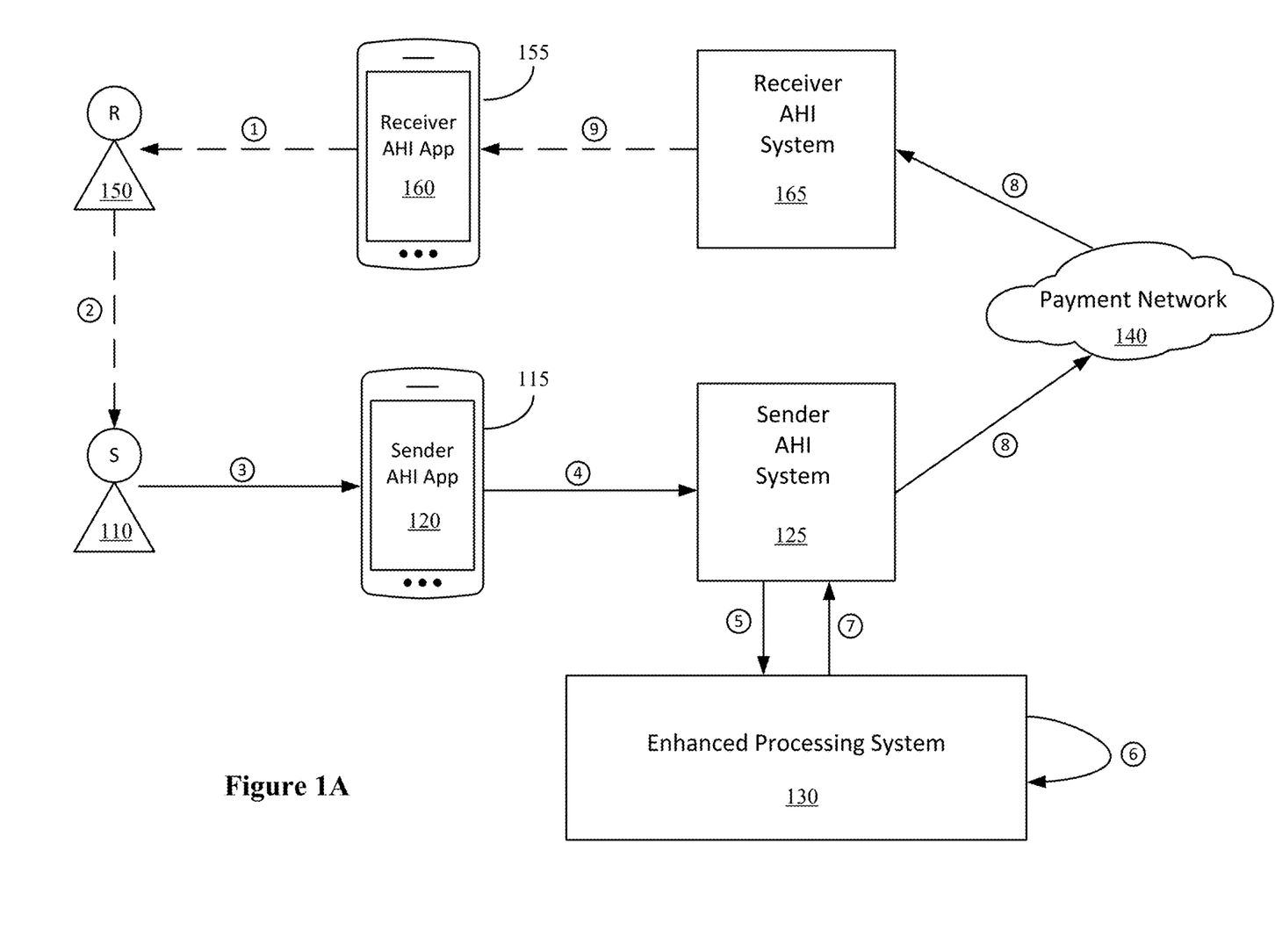
FIGS. 1A and 1B illustrate example operating environments and signal flows for sender-initiated (Push) PII secure P2P payments.
Figure 1B:
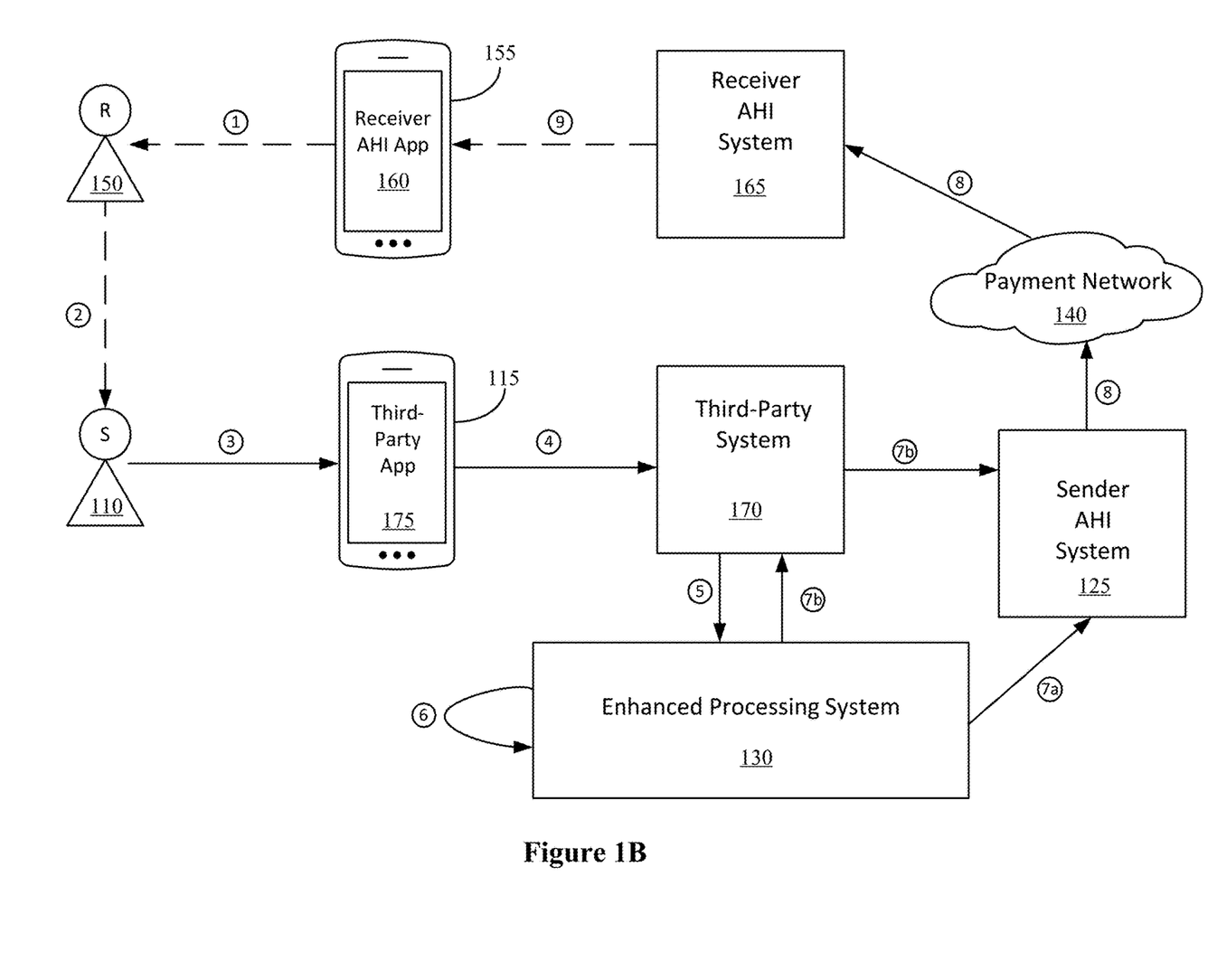

FIGS. 1A and 1B illustrate example operating environments and signal flows for sender-initiated (Push) PII secure P2P payments. Referring to FIG. 1A, an example operating environment can include a sender 110, a sender user device 115, a sender AHI application 120, a sender AHI system 125, an enhanced processing platform 130, a payment network 140, a receiver 150, a receiver user device 155, a receiver AHI application 160, and a receiver AHI system 165.

The sender 110 is a user that is sending a P2P payment to the receiver 150. The receiver 150 is a user that is receiving the P2P payment from the sender 110. In the illustrative example of FIG. 1A, the sender 110 is initiating the P2P payment. The sender user device 115 runs the sender AHI application 120, which is managed by the sender AHI system 125. The receiver user device 155 runs the receiver AHI application 160, which is managed by the receiver AHI system 165.

A user device (e.g., the sender user device 115 and the receiver user device 155) may be, but is not limited to, a personal computer, a laptop computer, a desktop computer, a tablet computer, a reader, a mobile device, a personal digital assistant, a smart phone, a gaming device or console, a wearable computer, a wearable computer with an optical head-mounted display, computer watch, a whiteboard, or a smart television.

An AHI system (e.g., the sender AHI system 125 and the receiver AHI system 165) can be a financial institution through which a user has an account. In some cases, an AHI system may be an issuer that provides a payment card to the user.

An AHI application (e.g., sender AHI application 120 and the receiver AHI application 160) may be an application, such as a mobile banking application, managed by an AHI system (e.g., the sender AHI system 125 and the receiver AHI system 165).

The payment network 140 routes payment information to the appropriate AHI system. The payment network 140 may be a real time payment network.

The enhanced processing platform 130 can include or communicate with a digitization platform (not shown), an account processing platform (not shown), and one or more data resources, such as a token vault (not shown). The digitization platform is responsible for digitization and tokenization of forms of payment. The account processing platform supports the management of consumer accounts. The token vault refers to a repository where issued digitized payment tokens and corresponding personal account numbers and account reference numbers are securely stored.

An account of a consumer (e.g., the sender 110 or the receiver 150) can be digitized for a virtual wallet/banking application for contactless or e-commerce payments and register with the enhanced processing platform 130. The virtual wallet application can be managed by an AHI system. When the account is being digitized, the AHI system can connect to the enhanced processing platform 130 to facilitate the set-up. During digitization, the digitization platform of the enhanced processing platform 130 issues a token PAN for the digitized account and passes that information to the account processing platform of the enhanced processing platform 130, which stores the consumer account information and token PANs in the token vault. The token PAN can be provisioned on the consumer's user device (e.g., the sender user device 115 or the receiver user device 155) and made available to the consumer to use for contactless, e-commerce, and P2P payments.

Figure 6:
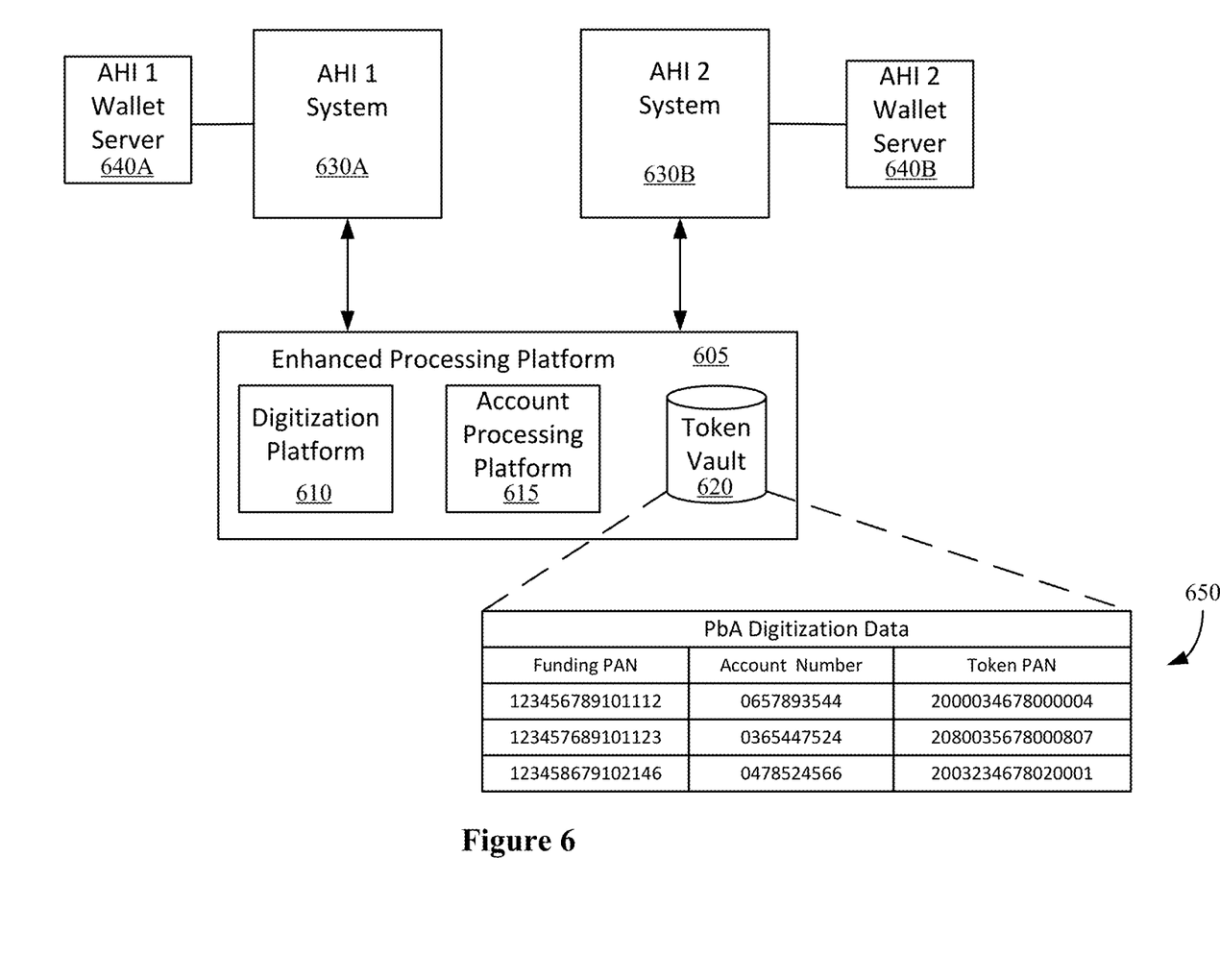
FIG. 6 illustrates an example operating environment for PII secure P2P payment processing.

A more detailed discussion of an enhanced processing platform and registration will be provided in FIG. 6.

Components (computing systems, storage resources, and the like) in the operating environment may operate on or in communication with each other over a communication network (not shown). The communication network can be, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The communication network may include one or more connected networks (e.g., a multi-network environment) including public networks, such as the Internet, and/or private networks such as a secure enterprise private network. Access to the communication network may be provided via one or more wired or wireless access networks as understood by those skilled in the art.

Communication to and from the components, such as the AHI systems and the enhanced processing platform, may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Conventionally, a receiver would provide a sender with personal contact information, such as a mobile phone number, email address, or username, for the sender to initiate a P2P payment. Advantageously, through the described techniques, no sharing of PII data (e.g., the personal contact information) is required. Instead, a receiver can provide a sender with a token PAN for the P2P payment as part of a sender-initiated (Push) PII secure P2P payment.

During an example sender-initiated (Push) PII secure P2P payment, the receiver 150 can use the receiver AHI application 160 on the receiver user device 155 to retrieve a receiver token PAN, as reflected by flow 1. As described above, the receiver token PAN can be made available to the receiver 150 when the receiver 150 registers with the enhanced processing platform 130 and a receiver account is digitized. Thus, the receiver 150 can pull up the receiver token PAN on the receiver AHI application 160. The receiver token PAN can be in the form of the receiver token PAN number or a quick response (QR) code.

The receiver 150 can send the receiver token PAN to the sender 110, as reflected by flow 2. The receiver 150 can send the receiver token PAN to the sender 110 a variety of ways, such as, for example, via a text message, email, or display of a QR code.

Once the sender 110 is provided the receiver token PAN, the sender 110 can initiate the P2P payment through the sender AHI application 120 on the sender user device 115, as reflected by flow 3. The sender 110 can initiate the P2P payment a variety of ways. For example, the sender 110 can submit the receiver token PAN from an operation accessing the text message or email or from the scanning of the receiver's QR code.

When the sender 110 initiates the P2P payment, the sender user device 115 receives a P2P transfer request from the sender 110. The P2P transfer request includes at least the receiver token PAN. In the illustrative example of FIG. 1A, the P2P transfer request is a request for a sender-initiated (Push) PII secure P2P payment. The sender AHI application 120 on the sender user device 115 can communicate the P2P transfer request to the sender AHI system 125, as reflected by flow 4.

The sender AHI system 125 can communicate a P2P transfer advice request to the enhanced processing platform 130, as reflected by flow 5. The P2P transfer advice request includes at least the receiver token PAN and a sender token PAN. The P2P transfer advice request is a request to translate the sender token PAN into the corresponding sender account number and the receiver token PAN into the corresponding receiver account number. The sender token PAN can be a token PAN issued to the sender 110 when the sender 110 registers with the enhanced processing platform 130 and a sender account is digitized. The sender AHI system 125 can obtain the sender token PAN before communicating the P2P transfer advice request.

The enhanced processing platform 130 can identify a sender account number corresponding to the sender account using the sender token PAN and a receiver account number corresponding to the receiver account using the receiver token PAN, as reflected by flow 6.

Once the account numbers are identified, the enhanced processing platform 130 can communicate an account authorization message to the sender AHI system 125, as reflected by flow 7. The account authorization message includes at least the sender account number and the receiver account number. The account authorization message authorizes the sender AHI system 125 to transfer the funds from the sender account associated with the sender account number to the receiver account associated with the receiver account number.

The sender AHI system 125 communicates with the payment network 140 and the receiver AHI system 165 to transfer the funds from the sender account associated with the sender account number to the receiver account associated with the receiver account number, as reflected by flow 8.

Once the funds have been transferred to the receiver's account as reflected by flow 8, the receiver AHI system 165 can notify the receiver 150 that the funds have been deposited by providing a notification via the receiver AHI application 160, as reflected by flow 9.

Referring to FIG. 1B, an example operating environment can include the sender 110, the sender user device 115, the sender AHI system 125, the enhanced processing platform 130, the payment network 140, the receiver 150, the receiver user device 155, the receiver AHI application 160, and the receiver AHI system 165, as described with respect for FIG. 1A, as well as a third-party system 170 and a third-party application 175.

The third-party system 170 may be a system or service that allows for mobile payments, such as P2P payments, to be made through the third-party application 175. Here, the sender user device 115 is running the third-party application 175, which is managed by the third-party system 170.

The sender 110 is a user that is sending a P2P payment to the receiver 150. The receiver 150 is a user that is receiving the P2P payment from the sender 110. In the illustrative example of FIG. 1B, the sender 110 is initiating the P2P payment through the third-party application 175. The receiver user device 155 runs the receiver AHI application 160, which is managed by the receiver AHI system 165.

As described in FIG. 1A, a user device (e.g., the sender user device 115 and the receiver user device 155) may be, but is not limited to, a personal computer, a laptop computer, a desktop computer, a tablet computer, a reader, a mobile device, a personal digital assistant, a smart phone, a gaming device or console, a wearable computer, a wearable computer with an optical head-mounted display, computer watch, a whiteboard, or a smart television.

As described in FIG. 1A, an AHI system (e.g., the sender AHI system 125 and the receiver AHI system 165) can be a financial institution through which a user has an account. In some cases, an AHI system may be an issuer that provides a payment card to the user. An AHI application (e.g., the receiver AHI application 160) may be an application, such as a mobile banking application, managed by an AHI system (e.g., the receiver AHI system 165). The payment network 140 routes payment information to the appropriate AHI system and may be a real time payment network.

As described in FIG. 1A, the enhanced processing platform 130 can include or communicate with a digitization platform (not shown), an account processing platform (not shown), and one or more data resources, such as a token vault (not shown). The digitization platform is responsible for digitization and tokenization of forms of payment. The account processing platform supports the management of consumer accounts. The token vault refers to a repository where issued digitized payment tokens and corresponding personal account numbers and account reference numbers are securely stored.

As described in FIG. 1A, an account of a consumer (e.g., the sender 110 or the receiver 150) can be digitized for a virtual wallet/banking application for contactless or e-commerce payments and register with the enhanced processing platform 130. The virtual wallet application can be managed by an AHI system. When the account is being digitized, the AHI system can connect to the enhanced processing platform 130 to facilitate the set-up. During digitization, the digitization platform of the enhanced processing platform 130 issues a token PAN for the digitized account and passes that information to the account processing platform of the enhanced processing platform 130, which stores the consumer account information and token PANs in the token vault. The token PAN can be provisioned on the consumer's user device (e.g., the sender user device 115 or the receiver user device 155) and made available to the consumer to use for contactless, e-commerce, and P2P payments.

A more detailed discussion of an enhanced processing platform and registration will be provided in FIG. 6.

During an example sender-initiated (Push) PII secure P2P payment, the receiver 150 can use the receiver AHI application 160 on the receiver user device 155 to retrieve a receiver token PAN, as reflected by flow 1. As described above, the receiver token PAN can be made available to the receiver 150 when the receiver 150 registers with the enhanced processing platform 130 and a receiver account is digitized. Thus, the receiver 150 can pull up the receiver token PAN on the receiver AHI application 160. The receiver token PAN can be in the form of the receiver token PAN number or a QR code.

The receiver 150 can send the receiver token PAN to the sender 110, as reflected by flow 2. The receiver 150 can send the receiver token PAN to the sender 110 a variety of ways, such as, for example, via a text message, email, or display of a QR code.

Once the sender 110 is provided the receiver token PAN, the sender 110 can initiate the P2P payment through the third-party application 175 on the sender user device 115, as reflected by flow 3. The sender 110 can initiate the P2P payment a variety of ways. For example, the sender 110 can submit the receiver token PAN from an operations accessing the text message or email or from scanning of the receiver's QR code. Conventionally, the third-party application 175 would require the sender 110 to provide personal contact information, such as a mobile phone number, email address, or username, of the receiver 150 to initiate a sender-initiated (Push) PII secure P2P payment. Advantageously, through the described techniques, no sharing of PII data (e.g., the personal contact information) is required. Instead, the receiver 150 and the sender 110 can share a token PAN for the P2P payment.

When the sender 110 initiates the P2P payment, the sender user device 115 receives a P2P transfer request from the sender 110. The P2P transfer request includes at least the receiver token PAN. In the illustrative example of FIG. 1B, the P2P transfer request is a request for a sender-initiated (Push) PII secure P2P payment. The third-party application 175 on the sender user device 115 can communicate the P2P transfer request to the third-party system 170, as reflected by flow 4.

The third-party system 170 can communicate a P2P transfer advice request to the enhanced processing platform 130, as reflected by flow 5. The P2P transfer advice request includes at least the receiver token PAN and a sender token PAN. The P2P transfer advice request is a request to translate the sender token PAN into the corresponding sender account number and the receiver token PAN into the corresponding receiver account number. The sender token PAN can be a token PAN issued to the sender 110 when the sender 110 registers with the enhanced processing platform 130 and a sender account is digitized. The third-party system 170 can obtain the sender token PAN before communicating the P2P transfer advice request.

The enhanced processing platform 130 can identify a sender account number using the sender token PAN corresponding to the sender account using the sender token PAN and a receiver account number corresponding to the receiver account using the receiver token PAN, as reflected by flow 6.

In some cases, once the account numbers are identified in flow 6, the enhanced processing platform 130 communicates an account authorization message to the sender AHI system 125 corresponding to the sender account number, as reflected by flow 7a.

In some cases, once the account numbers are retrieved in flow 6, the enhanced processing platform 130 communicates an account authorization message to the third-party system 170 and the third-party system 170 then communicates the account authorization message to the corresponding sender AHI system 125, as reflected by flow 7b.

The account authorization message includes at least the sender account number and the receiver account number and authorizes the sender AHI system 125 to transfer the funds from the sender account associated with the sender account number to the receiver account associated with the receiver account number.

The sender AHI system 125 communicates with the payment network 140 and the receiver AHI system 165 to transfer the funds from the sender account associated with the sender account number to the receiver account associated with the receiver account number, as reflected by flow 8.

Once the funds have been transferred to the receiver's account as reflected by flow 8, the receiver AHI system 165 can notify the receiver 150 that the funds have been deposited by providing a notification via the receiver AHI application 160, as reflected by flow 9.

Figure 2:
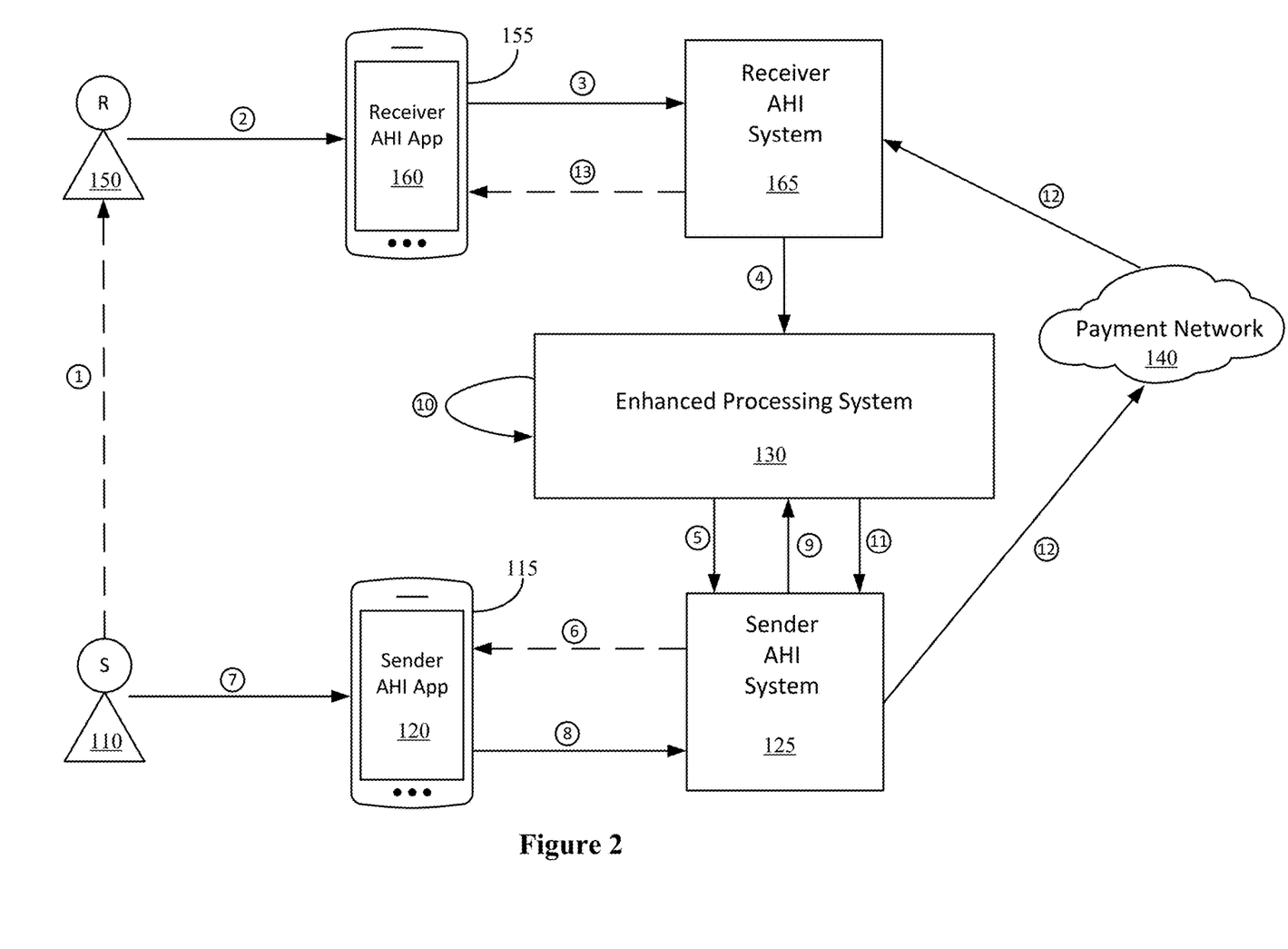
FIG. 2 illustrates an example operating environment and signal flow for receiver-initiated (Pull) PII secure P2P payments.

FIG. 2 illustrates an example operating environment and signal flow for receiver-initiated (Pull) PII secure P2P payments. Referring to FIG. 2, an example operating environment can include the sender 110, the sender user device 115, the sender AHI application 120, the sender AHI system 125, the enhanced processing platform 130, the payment network 140, the receiver 150, the receiver user device 155, the receiver AHI application 160, and the receiver AHI system 165, as described with respect to FIG. 1A.

The sender 110 is a user that is sending a P2P payment to the receiver 150. The receiver 150 is a user that is receiving the P2P payment from the sender 110. In the illustrative example of FIG. 2, the receiver 150 is initiating the P2P payment. The sender user device 115 runs the sender AHI application 120, which is managed by the sender AHI system 125. The receiver user device 155 runs the receiver AHI application 160, which is managed by the receiver AHI system 165.

As previously described with respect to FIG. 1A, a user device (e.g., the sender user device 115 and the receiver user device 155) may be, but is not limited to, a personal computer, a laptop computer, a desktop computer, a tablet computer, a reader, a mobile device, a personal digital assistant, a smart phone, a gaming device or console, a wearable computer, a wearable computer with an optical head-mounted display, computer watch, a whiteboard, or a smart television.

As previously described with respect to FIG. 1A, an AHI system (e.g., the sender AHI system 125 and the receiver AHI system 165) can be a financial institution through which a user has an account. In some cases, an AHI system may be an issuer that provides a payment card to the user. An AHI application (e.g., sender AHI application 120 and the receiver AHI application 160) may be an application, such as a mobile banking application, managed by an AHI system (e.g., the sender AHI system 125 and the receiver AHI system 165). The payment network 140 routes payment information to the appropriate AHI system and may be a real time payment network.

As previously described with respect to FIG. 1A, the enhanced processing platform 130 can include or communicate with a digitization platform (not shown), an account processing platform (not shown), and one or more data resources, such as a token vault (not shown). The digitization platform is responsible for digitization and tokenization of forms of payment. The account processing platform supports the management of consumer accounts. The token vault refers to a repository where issued digitized payment tokens and corresponding personal account numbers and account reference numbers are securely stored.

As previously described in FIG. 1A, an account of a consumer (e.g., the sender 110 or the receiver 150) can be digitized for a virtual wallet/banking application for contactless or e-commerce payments and register with the enhanced processing platform 130. The virtual wallet application can be managed by an AHI system. When the account is being digitized, the AHI system can connect to the enhanced processing platform 130 to facilitate the set-up. During digitization, the digitization platform of the enhanced processing platform 130 issues a token PAN for the digitized account and passes that information to the account processing platform of the enhanced processing platform 130, which stores the consumer account information and token PANs in the token vault. The token PAN can be provisioned on the consumer's user device (e.g., the sender user device 115 or the receiver user device 155) and made available to the consumer to use for contactless, e-commerce, and P2P payments.

A more detailed discussion of an enhanced processing platform and registration will be provided in FIG. 6.

Conventionally, a sender would provide a receiver with personal contact information, such as a mobile phone number, email address, or username, for the receiver to initiate a P2P payment. Advantageously, through the described techniques, no sharing of PII data (e.g., the personal contact information) is required. Instead, a sender can provide a receiver with a token PAN for the P2P payment as part of a receiver-initiated (Push) PII secure P2P payment.

During an example receiver-initiated (Push) PII secure P2P payment, the sender 110 can send the sender token PAN to the receiver 150, as reflected by flow 1. As described above, the sender token PAN is made available to the sender 110 when the sender 110 registered with the enhanced processing platform 130 and a sender account was digitized. Thus, the sender 110 can pull up the sender token PAN on the sender AHI application 120 and provide it to the receiver 150. The sender token PAN can be in the form of the sender token PAN number or a QR code. The sender 110 can send the sender token PAN to the receiver 150 a variety of ways, such as, for example, via a text message, email, or display of the QR code.

The receiver 150 can initiate the P2P payment through the receiver AHI application 160 on the receiver user device 155, as reflected by flow 2. The receiver 150 can initiate the P2P payment a variety of ways. For example, the receiver 150 can submit the sender token PAN from an operation accessing the text message or email or from the scanning of the sender's QR code.

When the receiver 150 initiates the P2P payment, the receiver user device 155 receives a P2P pull transfer request from the receiver 150. The P2P pull transfer request includes at least the sender token PAN corresponding to the sender 110. The receiver AHI application 160 on the receiver user device 155 can communicate the P2P pull transfer request to the receiver AHI system 165, as reflected by flow 3.

The receiver AHI system 165 can communicate a P2P pull transfer advice request to the enhanced processing platform 130, as reflected by flow 4. Then, as reflected by flow 5, the enhanced processing platform 130 communicates the P2P pull transfer advice request to the sender AHI system 125. The P2P pull transfer advice request includes at least the sender token PAN and a receiver token PAN. The P2P pull transfer advice request is a request to translate the sender token PAN into the corresponding sender account number and the receiver token PAN into the corresponding receiver account number. The receiver token PAN can be a token PAN issued to the receiver 150 when the receiver 150 registers with the enhanced processing platform 130 and a receiver account is digitized. The receiver AHI system 165 can obtain the receiver token PAN before communicating the P2P pull transfer advice request to the enhanced processing platform 130.

The sender AHI system 125 can notify the sender 110, via the sender AHI application 120, of the P2P pull transfer request, as reflected by flow 6. The sender 110 can confirm the P2P payment via the sender AHI application 120, as reflected by flow 7.

When the sender 110 confirms the P2P payment in flow 7, the sender user device 115 can receive a P2P transfer request from the sender 110. The P2P transfer request includes at least the receiver token PAN. The sender AHI application 120 on the sender user device 115 can communicate the P2P transfer request to the sender AHI system 125, as reflected by flow 8.

The sender AHI system 125 can communicate a P2P transfer advice request to the enhanced processing platform 130, as reflected by flow 9. The P2P transfer advice request includes at least the receiver token PAN and the sender token PAN. The P2P transfer advice request is a request to translate the sender token PAN into the corresponding sender account number and the receiver token PAN into the corresponding receiver account number.

The enhanced processing platform 130 can identify a sender account number corresponding to the sender account using the sender token PAN and a receiver account number corresponding to the receiver account using the receiver token PAN, as reflected by flow 10.

Once the account numbers are identified, the enhanced processing platform 130 can communicate an account authorization message to the sender AHI system 125, as reflected by flow 11. The account authorization message includes at least the sender account number and the receiver account number. The account authorization message authorizes the sender AHI system 125 to transfer the funds from the sender account associated with the sender account number to the receiver account associated with the receiver account number.

The sender AHI system 125 communicates with the payment network 140 and the receiver AHI system 165 to transfer the funds from the sender account associated with the sender account number to the receiver account associated with the receiver account number, as reflected by flow 12.

Once the funds have been transferred to the receiver's account as reflected by flow 12, the receiver AHI system 165 can notify the receiver 150 that the funds have been deposited by providing a notification via the receiver AHI application 160, as reflected by flow 13.

Figure 3:
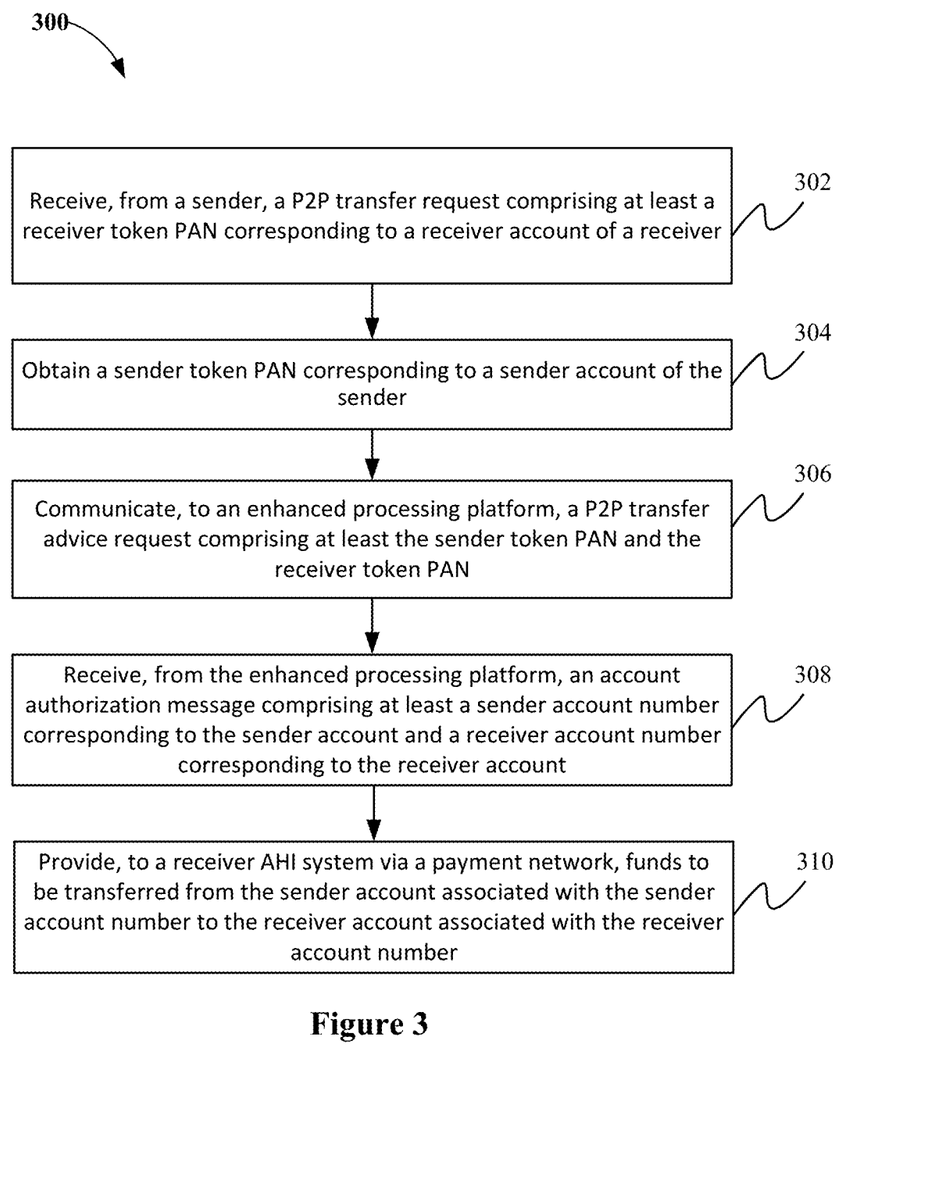
FIG. 3 illustrates an example process carried out by a sender AHI system according to an embodiment of the invention.

FIG. 3 illustrates an example process carried out by a sender AHI system according to an embodiment of the invention. Referring to FIG. 3, a sender AHI system, performing process 300, can be implemented by a system embodied as described with respect to system 700 shown in FIG. 7.

Process 300 may be implemented in the example operating environment shown in FIG. 1A. In some cases, process 300 may be implemented in the example operating environment shown in FIG. 1B. In this case, the sender AHI system is a third-party system, such as a third-party P2P payment system.

Referring to process 300, the sender AHI system can receive (302) a P2P transfer request from a sender. The P2P transfer request is a request for a sender-initiated (Push) PII secure P2P payment. The P2P transfer request can include at least a receiver token PAN corresponding to a receiver account of a receiver. The receiver token PAN can be issued to the receiver when the receiver registers with the enhanced processing platform and the receiver account is digitized. An example of operation 302 can be performed with flow 3 of FIG. 1A. In some cases, the receiver toke PAN received in the P2P transfer request is received in the form of a QR code.

The sender AHI system can obtain (304) a sender token PAN corresponding to a sender account of the sender. The sender token PAN is a token PAN issued to the sender when the sender registers with the enhanced processing platform and a sender account is digitized.

In some cases, the P2P transfer request includes a sender identifier. The sender identifier may be, for example, an identifier associated with a sender user device. In this case, the sender AHI system can obtain the sender token PAN using the sender identifier. In some cases, the P2P transfer request includes the sender token PAN. In this case, the sender AHI system can obtain the sender token PAN from the P2P transfer request.

The sender AHI system can communicate (306) a P2P transfer advice request to an enhanced processing platform. The P2P transfer advice request includes at least the receiver token PAN and the sender token PAN. The P2P transfer advice request is a request to translate the sender token PAN into the corresponding sender account number and the receiver token PAN into the corresponding receiver account number. An example of operation 306 can be performed with flow 5 of FIG. 1A.

The sender AHI system can receive (308) an account authorization message from the enhanced processing platform. The account authorization message includes at least a sender account number corresponding to the sender account and a receiver account number corresponding to the receiver account. The account authorization message authorizes the sender AHI system to transfer the funds from the sender account associated with the sender account number to the receiver account associated with the receiver account number. An example of operation 308 can be performed with flow 7 of FIG. 1A.

The sender AHI system can provide (310) the funds to be transferred from the sender account associated with the sender account number to the receiver account associated with the receiver account number to a receiver AHI system via a payment network. An example of operation 310 can be performed with flow 8 of FIG. 1A.

Figure 4:
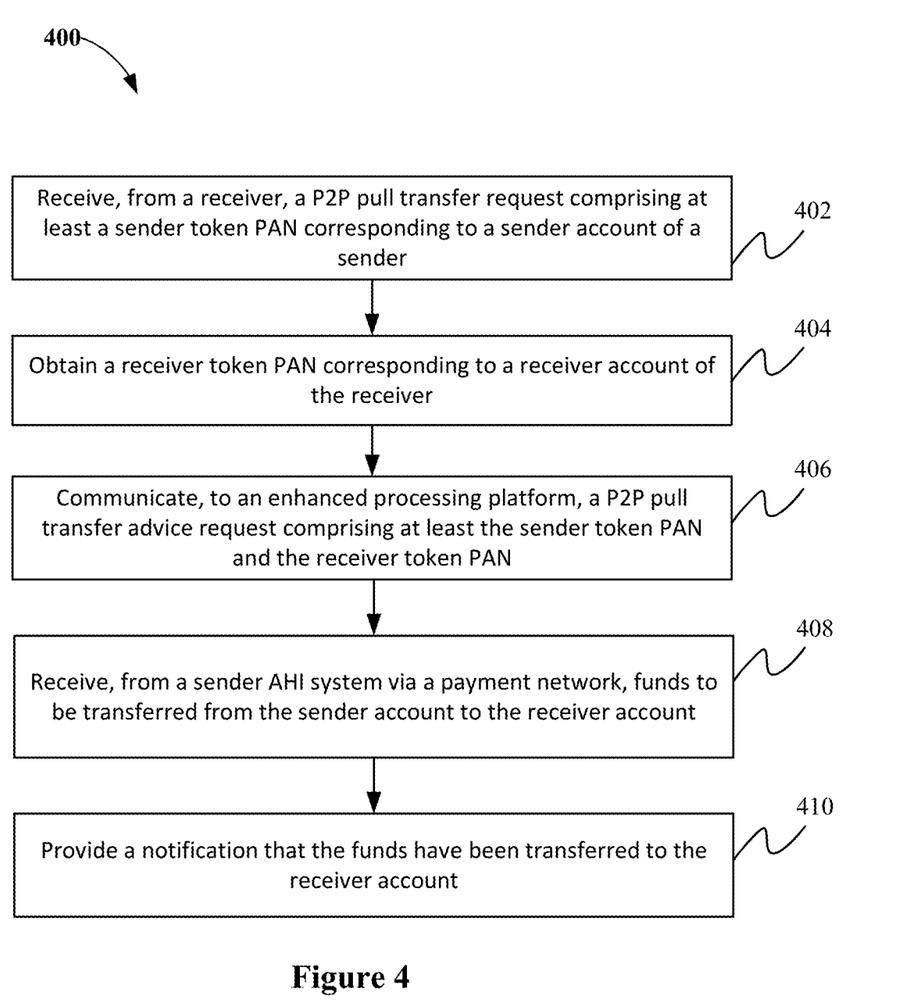
FIG. 4 illustrates an example process carried out by a receiver AHI system according to an embodiment of the invention.

FIG. 4 illustrates an example process carried out by a receiver AHI system according to an embodiment of the invention. Referring to FIG. 4, a receiver AHI system, performing process 400, can be implemented by a system embodied as described with respect to system 700 shown in FIG. 7. Process 400 may be implemented in the example operating environment shown in FIG. 2.

Referring to process 400, the receiver AHI system can receive (402) a P2P pull transfer request from a receiver. The P2P pull transfer request is a request for a receiver-initiated (Pull) PII secure P2P payment. The P2P pull transfer request can include at least a sender token PAN corresponding to a sender account of a sender. The sender token PAN can be issued to the sender when the sender registers with the enhanced processing platform and the sender account is digitized. An example of operation 402 can be performed with flow 2 of FIG. 2. In some cases, the sender token PAN received in the P2P pull transfer request is received in the form of a QR code.

The receiver AHI system can obtain (404) a receiver token PAN corresponding to a receiver account of the receiver. The receiver token PAN can be issued to the receiver when the receiver registers with the enhanced processing platform and the receiver account is digitized.

In some cases, the P2P pull transfer request includes a receiver identifier. The receiver identifier may be, for example, an identifier associated with a receiver user device. In this case, the receiver AHI system can obtain the receiver token PAN using the receiver identifier. In some cases, the P2P pull transfer request includes the receiver token PAN. In this case, the receiver AHI system can obtain the receiver token PAN from the P2P pull transfer request.

The receiver AHI system can communicate (406) a P2P pull transfer advice request to an enhanced processing platform. The P2P pull transfer advice request includes at least the sender token PAN and the receiver token PAN. The P2P pull transfer advice request is a request to translate the sender token PAN into the corresponding sender account number and the receiver token PAN into the corresponding receiver account number. An example of operation 406 can be performed with flow 4 of FIG. 2.

The receiver AHI system can receive (408) the funds to be transferred from the sender account to the receiver account from a sender AHI system via a payment network. The sender account is associated with the sender account number and the receiver account is associated with the receiver account number. An example of operation 408 can be performed with flow 12 of FIG. 2.

The receiver AHI system can provide (410) a notification that the funds have been transferred to the receiver account. The notification can be provided to the receiver through a receiver AHI application. An example of operation 410 can be performed with flow 13 of FIG. 2.

Figure 5:
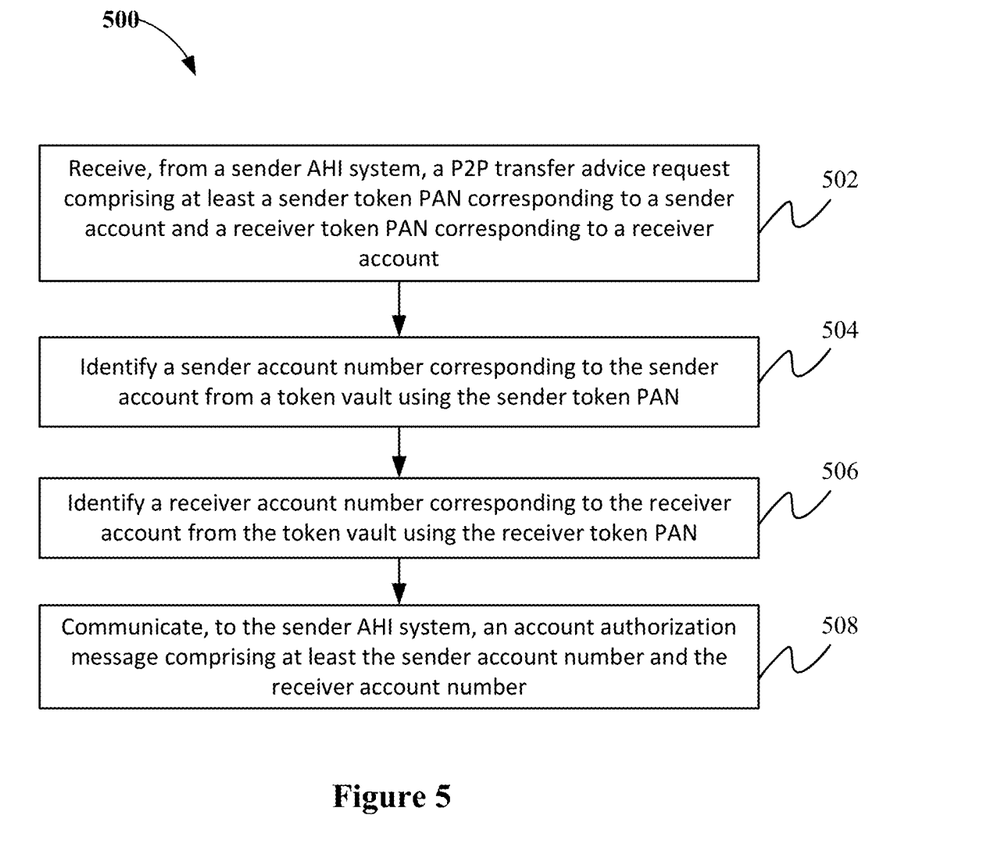
FIG. 5 illustrates an example process carried out by an enhanced processing platform according to an embodiment of the invention.

FIG. 5 illustrates an example process carried out by an enhanced processing platform according to an embodiment of the invention. Referring to FIG. 5, an enhanced processing platform (e.g., the enhanced processing platform 605 as described with respect to FIG. 6), performing process 500, can be implemented by a system embodied as described with respect to system 700 shown in FIG. 7.

The enhanced processing platform can include or communicate with a digitization platform, an account processing platform, and a token vault. Process 500 may be implemented in the example operating environment shown in FIG. 1A or FIG. 2. In some cases, process 500 may be implemented in the example operating environment shown in FIG. 1B. In this case, the sender AHI system is a third-party system, such as a third-party P2P payment system.

Conventionally, the account processing platform of the enhanced processing platform provides a person-to-merchant payment solution that allows a consumer to pay a merchant using either a payment card via a debit card PAN or a bank account via a bank account number.

Through the described techniques, the account processing platform can act as an orchestration or a mapping layer that allows for an AHI system to tokenize bank accounts as well as payment card accounts. Indeed, the enhanced processing platform manages mappings of tokens to both bank account numbers and payment card numbers contained within the token vault.

The account processing platform can provide real time payment and ACH infrastructure and can act as a real time payment processor on behalf of an AHI system. This allows a consumer to not only make contactless and e-commerce payments, but also P2P payments, via a debit transaction or via an account to account, real time payments transaction. Indeed, the introduction of the described token PAN allows for a single product to be used for contactless payments, e-commerce payments, and P2P payments.

Referring to process 500, the enhanced processing platform can receive (502) a P2P transfer advice request from a sender AHI system. The P2P transfer advice request includes at least a sender token PAN corresponding to a sender account and a receiver token PAN corresponding to a receiver account. The P2P transfer advice request is a request to translate the sender token PAN into the corresponding sender account number and the receiver token PAN into the corresponding receiver account number. Examples of operation 502 can be performed with flow 5 of FIG. 1A and flow 5 of FIG. 2.

In some cases, the enhanced processing platform receives the P2P transfer advice request from a third-party system, such as a third-party P2P payment system. In this case, an example of operation 502 can be performed with flow 5 of FIG. 1B.

Conventionally, a token PAN would not be used to make P2P payments. Indeed, a P2P transfer advice request would not include the token PAN. Instead, PII data, such as personal contact information, would be sent with the P2P transfer advice request to make a P2P payment. The PII data is used to identify the corresponding linked account number. For example, in a conventional P2P payment solution, a receiver's email address can be sent with the P2P transfer advice request and used to identify the linked receiver account number.

The enhanced processing platform can identify (504) a sender account number corresponding to the sender account using the sender token PAN and identify (506) a receiver account number corresponding to the receiver account using the receiver token PAN. Advantageously, PII data is not required by the enhance processing platform in order to identify an account number.

To identify (504) the sender account number and identify (506) the receiver account number, the account processing platform of the enhanced processing platform can retrieve the sender account number and receiver account number from the token vault using the corresponding token PANs. That is, the enhanced processing platform can communicate with the token vault to detokenize the digitized token PANs to determine the corresponding account numbers. Examples of operations 504 and 506 can be performed with flow 6 of FIGS. 1A and 1B and flow 10 of FIG. 2.

The enhanced processing platform can communicate (508) an account authorization message to the sender AHI system. The account authorization message includes at least the sender account number and the receiver account number. The account authorization message authorizes the sender AHI system to transfer the funds from the sender account associated with the sender account number to the receiver account associated with the receiver account number. An example of operation 508 can be performed with flow 7 of FIG. 1A, flow 7a of FIG. 1B, and flow 11 of FIG. 2.

In the case where the enhanced processing platform receives the P2P transfer advice request from the third-party system, the enhanced processing platform can communicate (508) an account authorization message to the third-party system and the third-party system can communicate that authorization message to the corresponding sender AHI system. In this case, an example of operation 508 can be performed with flow 7b of FIG. 1B.

In some cases, the P2P payment is an example receiver-initiated (Push) PII secure P2P payment. In this case, before receiving the P2P transfer advice request in operation 502, the enhanced processing platform can receive a P2P pull transfer advice request from a receiver. The P2P pull transfer advice request includes at least the sender token PAN and the receiver token PAN. The P2P pull transfer advice request is a request to translate the sender token PAN into the corresponding sender account number and the receiver token PAN into the corresponding receiver account number. An example of this can be performed at flow 4 of FIG. 2.

The enhanced processing platform can then communicate the P2P pull transfer advise request to the sender AHI system. An example of this can be performed at flow 5 of FIG. 2.

FIG. 6 illustrates an example operating environment for PII secure P2P payment processing. Referring to FIG. 6, an example operating environment can include an enhanced processing platform 605, a digitization platform 610, an account processing platform 615, a token vault 620, an AHI system 630 (e.g., AHI 1 system 630A and AHI 2 system 630B), and an AHI wallet server 640 (e.g., AHI 1 wallet server 640A and AHI 2 wallet server 640B).

The enhanced processing platform 605, includes or communicates with the digitization platform 610, the account processing platform 615, and the token vault 620.

The digitization platform 610 is responsible for digitization and tokenization of forms of payment. The account processing platform 615 supports the management of consumer accounts.

The account processing platform 615 can act as an orchestration or a mapping layer that allows for an AHI system 630 to tokenize bank accounts as well as payment card accounts. The account processing platform 615 can provide real time payment and ACH infrastructure and can act as a real time payment processor on behalf of an AHI system 630. This allows a consumer to pay via a debit transaction or via an account to account, real time payments transaction. The described techniques leveraging the payment rails to allow a token PAN to flow over a card payment rails in the authorization leg and then allow the consumer to settle in either real time payments or card.

A token vault refers to a repository where issued digitized payment tokens and corresponding personal account numbers and account reference numbers are securely stored. In the example operating environment, the token vault 620 includes one or more data sets, including digitized data 650 that contains mappings of tokens to both bank account numbers and payment card account numbers. Advantageously, while the enhanced processing platform 605 has access to account data, there is no access to PII data to map that account data to an actual consumer. Thus, reducing risk of identity theft.

The AHI system 630 (e.g., AHI 1 system 630A and AHI 2 system 630B) includes or communicates with the AHI wallet server 640 (e.g., AHI 1 wallet server 640A and AHI 2 wallet server 640B).

The AHI wallet server 640 can host a virtual wallet application. A virtual wallet application stores payment card information, which can be used to make contactless payments or e-commerce payments. Each AHI system 630 can manage a virtual wallet application.

An AHI system 630 can register with the enhanced processing platform 605. For example, an AHI system 630 can provide consumer information and corresponding bank account information to the enhanced processing platform 605.

An account of a consumer can be digitized for a virtual wallet/banking application for contactless or e-commerce payments. When the account is being digitized, the AHI wallet server 640 can connect to the enhanced processing platform 605. During digitization, the digitization platform 610 issues a token PAN for the digitized account and passes that information to the account processing platform 615, which stores the consumer account information and token PANs in the token vault 620. The token PAN can be provisioned on the consumer's user device and made available to the consumer to use for contactless, e-commerce, and P2P payments. Advantageously, using the issued token PAN for P2P payments allows consumers and AHI systems to provide a P2P payment solution where the consumer does not need to share account information with a sender/receiver.

Figure 7:
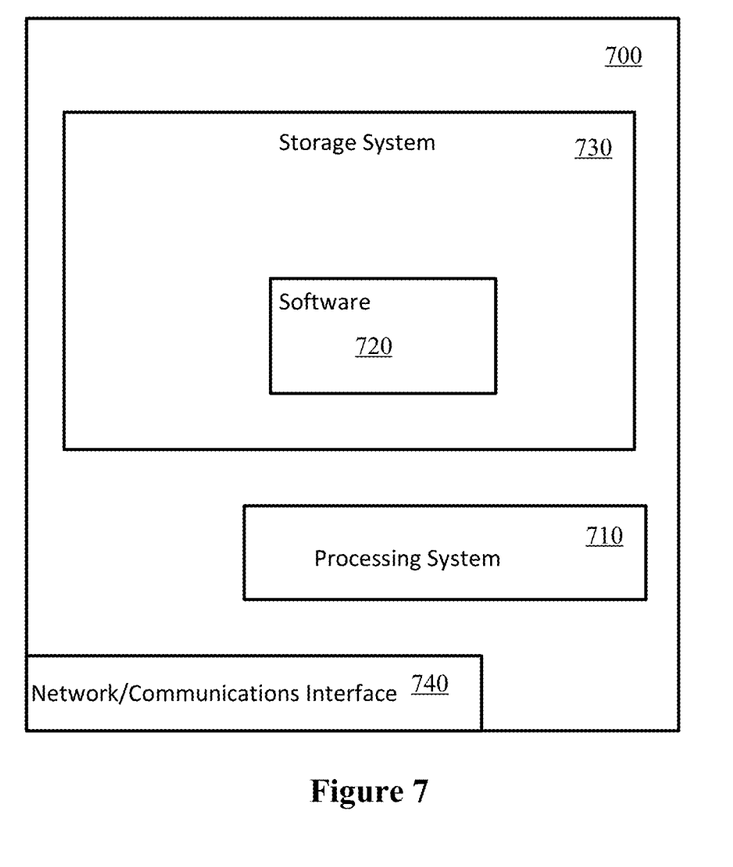
FIG. 7 illustrates components of a computing system that may be used in certain embodiments described herein.

FIG. 7 illustrates components of a computing system that may be used in certain embodiments described herein. Referring to FIG. 7, system 700 may be implemented within a single computing device or distributed across multiple computing devices or sub-systems that cooperate in executing program instructions. The system 700 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 700 can include a processing system 710, which may include one or more processors and/or other circuitry that retrieves and executes software 720 from storage system 730. Processing system 710 may be implemented within a single processing device but may also be distributed across multiple processing devices or sub-systems that cooperate in executing program instructions.

Storage system(s) 730 can include any computer readable storage media readable by processing system 710 and capable of storing software 720. Storage system 730 may be implemented as a single storage device but may also be implemented across multiple storage devices or sub-systems co-located or distributed relative to each other. Storage system 730 may include additional elements, such as a controller, capable of communicating with processing system 710. Storage system 730 may also include storage devices and/or sub-systems on which data is stored. System 700 may access one or more storage resources in order to access information to carry out any of the processes indicated by software 720.

Software 720, including routines for performing processes, such as process 300 for a sender AHI system, process 400 for a receiver AHI system, or process 500 for an enhanced processing platform, may be implemented in program instructions and among other functions may, when executed by system 700 in general or processing system 710 in particular, direct the system 700 or processing system 710 to operate as described herein.

In embodiments where the system 700 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 740 may be included, providing communication connections and devices that allow for communication between system 700 and other computing systems (not shown) over a communication network or collection of networks (not shown) or the air.

In some embodiments, system 700 may host one or more virtual machines.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
   a processing system;
   a storage system that does not contain personally identifiable information (PII);
   a data resource that does not contain PII and having tokenized personal account numbers (PANs) and account numbers corresponding to the tokenized PANS;
   a data set stored on the data resource, the data set providing at least a mapping of account numbers, payment card account numbers, and token PANs, wherein the token PANs do not contain personally identifiable information; and
   instructions stored on the storage system that, when executed by the processing system, direct the processing system to at least:
      receive, from a sender account holding institution (AHI) system via a payment card rail, a P2P transfer advice request that does not contain PII and comprises at least a sender token PAN corresponding to a sender account and a receiver token PAN corresponding to a receiver account;
      identify a sender account number corresponding to the sender account from the data resource using the sender token PAN;
      identify a receiver account number corresponding to the receiver account from the data resource using the receiver token PAN; and
      communicate, to the sender AHI system via the payment card rail, an account authorization message that does not contain PII and comprises at least the sender account number and the receiver account number.

2. The system of claim 1, wherein the instructions further direct the processing system to at least:
   before receiving the P2P transfer advice request, receive, from a receiver AHI system, a P2P pull transfer advice request comprising at least the sender token PAN and the receiver token PAN; and
   communicate the P2P pull transfer advice request to the sender AHI system.

3. The system of claim 2, wherein the P2P pull transfer advice request is a request to translate the sender token PAN into the corresponding sender account number and the receiver token PAN into the corresponding receiver account number.

4. The system of claim 1, wherein the P2P transfer advice request is a request to translate the sender token PAN into the corresponding sender account number and the receiver token PAN into the corresponding receiver account number.

5. The system of claim 1, wherein the account authorization message authorizes funds to be transferred from a sender account associated with the sender account number to a receiver account associated with the receiver account number.

6. The system of claim 1, wherein the sender AHI system is a third-party system.

7. One or more computer-readable storage media having instructions stored thereon that when executed by a processing system, direct the processing system to:
   receive, from a sender account holding institution (AHI) system via a payment card rail, a P2P transfer advice request that does not contain PII and comprises at least a sender token PAN corresponding to a sender account and a receiver token PAN corresponding to a receiver account;
   identify a sender account number corresponding to the sender account from a data resource using the sender token PAN, the data resource does not contain PII and comprises a data set providing at least a mapping of account numbers, payment card account numbers, and token PANs, wherein the token PANs do not contain personally identifiable information;
   identify a receiver account number corresponding to the receiver account from the data resource using the receiver token PAN; and
   communicate, to the sender AHI system via the payment card rail, an account authorization message that does not contain PII and comprises at least the sender account number and the receiver account number.

8. The media of claim 7, wherein the instructions further direct the processing system to at least:
   before receiving the P2P transfer advice request, receive, from a receiver AHI system, a P2P pull transfer advice request comprising at least the sender token PAN and the receiver token PAN; and
   communicate the P2P pull transfer advice request to the sender AHI system.

9. The media of claim 8, wherein the P2P pull transfer advice request is a request to translate the sender token PAN into the corresponding sender account number and the receiver token PAN into the corresponding receiver account number.

10. The media of claim 7, wherein the P2P transfer advice request is a request to translate the sender token PAN into the corresponding sender account number and the receiver token PAN into the corresponding receiver account number.

11. The media of claim 7, wherein the account authorization message authorizes funds to be transferred from a sender account associated with the sender account number to a receiver account associated with the receiver account number.

12. The media of claim 7, wherein the sender AHI system is a third-party system.

13. A method comprising:
receiving, from a sender account holding institution (AHI) system via a payment card rail, a P2P transfer advice request that does not contain PII and comprises at least a sender token PAN corresponding to a sender account and a receiver token PAN corresponding to a receiver account;
identifying a sender account number corresponding to the sender account from a data resource using the sender token PAN, the data resource does not contain PII and comprises a data set providing at least a mapping of account numbers, payment card account numbers, and token PANs, wherein the token PANs do not contain personally identifiable information;
identifying a receiver account number corresponding to the receiver account from the data resource using the receiver token PAN; and
communicating, to the sender AHI system via the payment card rail, an account authorization message that does contain PII and comprises at least the sender account number and the receiver account number.

14. The method of claim 13, further comprising:
before receiving the P2P transfer advice request, receiving, from a receiver AHI system, a P2P pull transfer advice request comprising at least the sender token PAN and the receiver token PAN; and
communicating the P2P pull transfer advice request to the sender AHI system.

15. The method of claim 14, wherein the P2P pull transfer advice request is a request to translate the sender token PAN into the corresponding sender account number and the receiver token PAN into the corresponding receiver account number.

16. The method of claim 13, wherein the P2P transfer advice request is a request to translate the sender token PAN into the corresponding sender account number and the receiver token PAN into the corresponding receiver account number.

17. The method of claim 13, wherein the account authorization message authorizes funds to be transferred from a sender account associated with the sender account number to a receiver account associated with the receiver account number.

18. The method of claim 13, wherein the sender AHI system is a third-party system.

* * * * *